United States Patent [19]

Nyström et al.

[11] Patent Number: 5,985,235
[45] Date of Patent: Nov. 16, 1999

[54] METHOD OF TREATING A CATALYST

[75] Inventors: Mats Nyström, Ytterby; Mikael Siverström, Partille, both of Sweden

[73] Assignee: EKA Chemicals AB, Bohus, Sweden

[21] Appl. No.: 08/759,807

[22] Filed: Dec. 3, 1996

[30] Foreign Application Priority Data

Dec. 4, 1995 [SE] Sweden .................................. 9504327

[51] Int. Cl.$^6$ .......................... C01B 15/023; B01J 38/60; B01J 38/62
[52] U.S. Cl. .............................. 423/588; 502/27; 502/28; 502/325
[58] Field of Search .............................. 423/588; 502/27, 502/24, 325, 28

[56] References Cited

U.S. PATENT DOCUMENTS

| | | | |
|---|---|---|---|
| 2,692,240 | 10/1954 | Sprauer .................................. | 423/588 |
| 2,704,281 | 3/1955 | Appell ........................................ | 502/27 |
| 3,009,782 | 11/1961 | Porter . | |
| 3,694,376 | 9/1972 | Kabisch et al. .......................... | 423/588 |
| 3,791,989 | 2/1974 | Mitchell et al. ........................... | 502/28 |
| 3,879,311 | 4/1975 | Schott et al. ............................. | 502/27 |
| 3,901,822 | 8/1975 | Browning et al. ....................... | 423/588 |
| 4,428,923 | 1/1984 | Kunkel et al. . | |
| 4,552,748 | 11/1985 | Berglin et al. . | |
| 4,800,073 | 1/1989 | Bengtsson et al. . | |
| 4,800,074 | 1/1989 | Bengtsson et al. . | |
| 4,830,997 | 5/1989 | Trinh et al. ............................... | 502/28 |
| 5,063,043 | 11/1991 | Bengtsson . | |
| 5,071,634 | 12/1991 | Maunula et al. . | |
| 5,475,182 | 12/1995 | Janssen .................................... | 585/640 |
| 5,585,316 | 12/1996 | Nay et al. ................................. | 502/325 |
| 5,654,254 | 8/1997 | Wu et al. .................................. | 502/325 |

FOREIGN PATENT DOCUMENTS

| | | | |
|---|---|---|---|
| 0670182 | 9/1995 | European Pat. Off. . | |
| 1427928 | 1/1966 | France . | |
| 1120432 | 12/1961 | Germany ................................. | 502/28 |
| 3718352 | 12/1988 | Germany ................................. | 502/24 |
| 47023386 | 10/1972 | Japan . | |
| 51991 | 4/1979 | Japan ...................................... | 502/27 |
| 144149 | 6/1990 | Japan ...................................... | 502/27 |
| 798237 | 7/1958 | United Kingdom . | |

OTHER PUBLICATIONS

Kirk–Othmer, *Encyclopedia of Chemical Technology,* Third Edition, vol. 15 (1981), John Wiley & Sons, pp. 855, 856.

*Primary Examiner*—Wayne Langel
*Attorney, Agent, or Firm*—McDermott, Will & Emery

[57] ABSTRACT

The invention relates to a method of activating a catalyst for hydrogenation of anthraquinones or derivatives thereof used in production of hydrogen peroxide comprising the step of treating the catalyst with an acid. The invention also relates to a method of producing hydrogen peroxide.

22 Claims, No Drawings

METHOD OF TREATING A CATALYST

The present invention relates to a method for activating a catalyst used in hydrogenation of anthraquinones or derivatives thereof in production of hydrogen peroxide.

The most common process for production of hydrogen peroxide is the anthraquinone process. In this process alkylated anthraquinones dissolved in suitable organic solvents, a so called working solution, are treated with hydrogen in the presence of a catalyst to form the corresponding hydroquinones. The hydroquinones are then oxidized to quinones with oxygen (usually air) with simultaneous formation of hydrogen peroxide which is extracted with water while the quinones are returned with the working solution to the hydrogenation step.

The hydrogenation is the most important step in modern hydrogen peroxide production and different methods of performing this step efficiently are described in the literature. For example, U.S. Pat. No. 4,428,923 discloses use of a catalyst suspended in the working solution, U.S. Pat. No. 3,009,782 discloses use of a fixed bed of catalyst particles, U.S. Pat. Nos. 4,552,748 and 5,063,043 disclose use of a monolithic fixed bed catalyst, and U.S. Pat. No. 5,071,634 discloses use of a catalyst coated static mixer.

It has been found that the activity of the hydrogenation catalyst decreases after some time of operation.

EP-A-670182 discloses reactivation of a hydrogenation catalyst by treatment with oxidized working solution.

Derwent Abstract WPI Acc. No. 72-75387T/47, abstract of JP-A47023386, discloses a method for regenerating a hydrogenation catalyst by treatment with an aqueous solution of a compound selected from hydroxides, carbonates and silicate of alkali metal and ammonia.

It is an object of the invention to provide an improved method of activating a hydrogenation catalyst for hydrogen peroxide production. It is another object of the invention to provide a method of obtaining an activated catalyst having only a low rate of deactivation.

The invention concerns a method of activating a catalyst for hydrogenation of anthraquinones or derivatives thereof used in production of hydrogen peroxide comprising the step of treating the catalyst with an acid. The acid is preferably a mineral acid such as nitric acid, sulfuric acid, phosphoric or phosphorous acids, hydrohalogenic acids, e.g. hydrochloric acid or perchloric acid, but also organic acids such as sulfonic acids or oxalic acid may be used. The concentration of the acid is preferably from about 0.05 to about 18 mol/l, most preferably from about 0.8 to about 9 mol/l. Preferred acids are nitric acid, orthophosphoric acid and sulfuric acid. It is particularly preferred to use nitric acid with a concentration from about 0.5 to about 50% by weight, preferably from about 5 to about 40% by weight, orthophosphoric acid with a concentration from about 2 to about 85% by weight, preferably from about 10 to about 50% by weight, or sulfuric acid with a concentration from about 0.5 to about 98% by weight, preferably from about 5 to about 60% by weight.

The catalyst is preferably contacted with an acid for more than about 5 minutes, most preferably for more than about 30 minutes. There is no critical upper limit, but normally no advantage is gained by treatment for more than about 24 hours. The temperature is suitably maintained below the boiling point at normal pressure, preferably from about 10 to about 35° C. Preferably the catalyst is treated with an acid in two or more separate steps. In each step the catalyst is preferably contacted with the acid for from about 5 to about 600 minutes, most preferably from about 20 to about 200 minutes.

Most preferably the catalyst is first treated with a preferably non-polar organic solvent and then with an acid in one or several steps, preferably without any drying step or any rinsing step between. The organic solvent may for example be selected from aromatic, aliphatic or naphthenic hydrocarbons or mixtures thereof. More specific examples of useful organic solvents include for example benzene, alkylated or polyalkylated benzenes such as tert-butylbenzene or trimethyl benzene, alkylated toluene or naphthalene such as tert-butyltoluene or methylnaphthalene, or mixtures thereof. The spent organic solvent may be used to form a part of the working solution in the production of the hydrogen peroxide. Preferably the catalyst is contacted with the organic solvent for more than about 5 minutes, most preferably for more than about 30 minutes. There is no critical upper limit, but normally no advantage is gained by treatment for more than about 24 hours. The temperature is suitably maintained below the boiling point at normal pressure, preferably from about 10 to about 35° C. Normally it is sufficient to treat with the organic solvent in one step, but two or several steps are possible. Suitably the final acid treatment is followed by one or several washing steps with water.

The different treatment steps may, for example, be performed by immersing the catalyst in vessels containing the respective liquids, or by bringing the liquid to flow through the hydrogenation reactor in which the catalyst is arranged.

The catalyst may comprise any active material commonly used for the hydrogenation step in the anthraquinone process, for example nickel, particularly Raney nickel, or precious metals such as palladium, platinum, rhodium or ruthenium, or mixtures thereof. The invention is particularly advantageous if the catalytically active material is attached to a carrier. Suitable carrier materials are silica, silicate, alumina, active carbon, carbonates of alkaline earth metals such as magnesium, calcium, barium or strontium, oxides of magnesium, aluminium, titanium or zirconium, or carbides of magnesium, silicon, aluminium, titanium or zirconium. Preferred carrier materials are silica and alumina. The carrier may form discrete particles or be arranged on a monolithic support structure which, for example, may form substantially parallel channels coated with the catalyst or a catalyst coated static mixer. Such a support structure may, for example, be made of ceramic, metallic or polymeric materials or glass cloth.

The method of activation according to the invention can be performed on a new catalyst or on a catalyst that has been used and thereby lost an unsatisfactory deal of its original activity, which normally occurs after from about 3 to about 24 months of operation. It has been found that not only the activity of the used catalyst is restored, the treated catalyst also shows a considerably less tendency to lose its activity when it is taken into operation again.

The invention also concerns a method of producing hydrogen peroxide according to the anthraquinone process involving alternate oxidation and hydrogenation of anthraquinones or derivatives thereof in a working solution of organic solvents in the presence of a catalyst, the method comprising a step of activating the hydrogenation catalyst by treatment with an acid as described above.

The hydrogenation is suitably performed at a temperature from about 0 to about 100° C., preferably from about 40 to about 70° C., and at a pressure from about 10 to about 1500 kPa, preferably from about 200 to about 600 kPa. Preferably alkylated anthraquinones such as 2-alkyl-9,10-anthraquinones are used. Examples of useful alkyl-anthraquinones are 2-ethylanthraquinone, 2-tertbutylanthroquinone, 2-hexenylanthraquinone, eutectic mixtures of alkyl-anthraquinone mixtures of 2-amylanthraquinones, and their tetrahydro derivatives. The working solution suitably comprises one or more quinone solvents and one or more hydroquinone solvents. Suitable quinone solvents may include aromatic, aliphatic or naphtenic hydrocarbons, for example benzene, alkylated or polyalkylated benzenes such as tert-butylbenzene or trimethyl benzene, alkylated toluene or naphthalene such as tert-butyltoluene or methylnaphthalene. Suitable hydroquinone solvents may include alkyl phosphates, alkyl phosphonates, nonyl alcohols, alkylcyclohexanol esters, N,N, dialkyl carbonamides, tetraalkyl ureas, N-alkyl-2-pyrrolidones. Particularly preferred hydroquinone solvents are described in the U.S. Pat. No. 4,800,073 and 4,800,074 and include alkylsubstituted caprolactams and cyclic urea derivatives such as N,N'-dialkylsubstituted alkylenurea.

Regarding suitable and preferred catalysts, the above description of the activation method is referred to.

Further details regarding hydrogen peroxide production as such appear in the patents cited herein, particularly U.S. Pat. No. 4,552,748 and U.S. Pat. No. 4,800,074.

The invention is further described through the following example. If nothing else is stated, all contents and percentages are based on the weight.

EXAMPLE 1

A monolithic palladium catalyst on a silica carrier which had been used for hydrogenation of alkyl anthraquinone in production of hydrogen peroxide and having parallel channels was cut into pieces with a diameter of 25 mm and a length of 200 mm. The catalysts were activated with different methods by immersing the pieces in vessels containing the respective liquids at room temperature. Shellsol™ refers to a solvent consisting essentially of $C_4$ alkylbenzene derivatives.

A (The Invention)

The used catalyst was treated according to the following sequence:

48 hours Shellsol™

3 hours 15 vol % sulfuric acid 3 hours 15 vol % sulfuric acid rinsing in de-ionised water B (The Invention)

The used catalyst was treated according to the following sequence:

48 hours Shellsol™

3 hours 15 vol % nitric acid 3 hours 15 vol % nitric acid rinsing in de-ionised water C (The Invention)

The used catalyst was treated according to the following sequence:

48 hours Shellsol™

1 hour acetone 2 hours drying 3 hours 30 vol % orthophosphoric acid 3 hours 30 vol % orthophosphoric acid rinsing in de-ionised water D (Comparison)

The used catalyst was treated according to the following sequence:

48 hours Shellsol™

1 hour acetone 2 hours drying 3 hours 5 wt % aqueous sodium hydroxide solution 3 hours 5 wt % aqueous sodium hydroxide solution rinsing in de-ionised water E (Comparison)

The used catalyst was treated according to the following sequence:

48 hours Shellsol™

1 hour acetone 2 hours drying 3 hours ammonia (aqueous solution of pH 10)

3 hours water 3 hours water rinsing in de-ionised water

F (The Invention): Not used catalyst was treated according to the following sequence:

48 hours Shellsol™

1 hours 15 vol % nitric acid 1 hours 15 vol % nitric acid rinsing in water

G (Reference)

The used catalyst was not treated at all.

H (Reference)

Not used catalyst was not treated at all.

The activity of each catalyst peace was tested in a 0.2 liters hydrogenation reactor. The results appear in the table below in which the activity for each sample is expressed as percent of the activity of the untreated piece of the not used catalyst H after the corresponding time of operation.

| catalyst | activity after 1 day | activity after 7 days | activity after 14 days |
|---|---|---|---|
| A | 88% | 93% | 94% |
| B | 102% | 108% | 109% |
| C | 71% | 88% | 94% |
| D | 67% | 48% | strong deactivation |
| E | 75% | 82% | strong deactivation |
| F | 98% | 104% | 105% |
| G | 57% | 58% | 58% |
| H | 100% | 100% | 100% |

The experiments show that particularly the activity after 14 days of operation was superior for the catalysts A, B, C and F treated according to the invention.

We claim:

1. A method for producing hydrogen peroxide comprising the steps of:

(a) catalytically hydrogenating anthraquinone or a derivative thereof to form the corresponding anthraquinone;

(b) oxidizing the anthraquinone to form hydrogen peroxide and reform the anthraquinone;

(c) repeating steps (a) and (b) until the performance of the hydrogenation catalyst deteriorates;

(d) treating the deteriorated hydrogenation catalyst with acid selected from the group consisting of a mineral acid, a sulfonic acid, oxalic acid, and mixtures thereof, and thereafter washing the catalyst, to thereby restore catalytic activity; and (e) repeating step (c).

2. A method as claimed in claim 1, wherein the step of treating the catalyst includes treating with nitric acid, sulfuric acid or phosphoric acid.

3. A method as claimed in claim 1, including contacting the catalyst with phosphoric acid.

4. A method as claimed in claim 1, including the step of treating the catalyst with an organic solvent prior to treating with acid.

5. A method as claimed in claim 4, wherein the organic solvent is one or more aromatic, aliphatic or naphthenic hydrocarbons.

6. A method as claimed in claim 1, including the step of washing the catalyst with water after the treatment.

7. A method as claimed in claim 1, wherein the catalyst comprises an active material selected from the group consisting of nickel, palladium, platinum, rhodium, ruthenium, and mixtures thereof.

8. A method as claimed in claim 1, wherein the catalytically active material is attached to a carrier.

9. A method as claimed in claim 1, wherein the catalyst was previously used for hydrogenation of anthraquinones or derivatives thereof in production of hydrogen peroxide.

10. A method as claimed in claim 1, including contacting the catalyst with the acid for more than about 5 minutes.

11. A method of activating a catalyst for hydrogenation of anthraquinones or derivatives thereof used in production of hydrogen peroxide, comprising treating the catalyst with an acid selected from the group consisting of a mineral acid, a sulfonic acid, oxalic acid and mixtures thereof, and thereafter washing the catalyst, wherein the catalyst has previously been used for production of hydrogen peroxide.

12. A method as claimed in claim 11, wherein the step of treating the catalyst includes treating with nitric acid, sulfuric acid or phosphoric acid.

13. A method as claimed in claim 11, including contacting the catalyst with acid for more than about 5 minutes.

14. A method as claimed in claim 11, including the step of treating the catalyst with an organic solvent prior to treating with acid.

15. A method as claimed in claim 14, wherein the organic solvent is selected from the group consisting of aromatic, aliphatic, and naphthenic hydrocarbons, and mixtures thereof.

16. A method as claimed in claim 11, including the step of washing the catalyst with water after the acid treatment.

17. A method as claimed in claim 11, wherein the catalyst comprises an active material selected from the group consisting of nickel, palladium, platinum, rhodium, ruthenium, and mixtures thereof.

18. A method as claimed in claim 11, wherein the catalytically active material is attached to a carrier.

19. A method for producing hydrogen peroxide comprising the steps of:
  (a) catalytically hydrogenating anthraquinone or a derivative thereof to form the corresponding anthraquinone;
  (b) oxidizing the anthraquinone to form hydrogen peroxide and reform the anthraquinone;
  (c) repeating steps (a) and (b) until the performance of the hydrogenation catalyst deteriorates;
  (d) treating the deteriorated hydrogenation catalyst with acid selected from the group consisting of a mineral acid, a sulfonic acid, and mixtures thereof, and thereafter washing the catalyst, to thereby restore catalytic activity; and
  (e) repeating step (c).

20. A method for producing hydrogen peroxide comprising the steps of:
  (a) catalytically hydrogenating anthraquinone or a derivative thereof with a hydrogenation catalyst selected from the group consisting of palladium, platinum, rhodium, ruthenium, and mixtures thereof, to thereby form the corresponding anthraquinone;
  (b) oxidizing the anthraquinone to form hydrogen peroxide and reform the anthraquinone;
  (c) repeating steps (a) and (b) until the performance of the hydrogenation catalyst deteriorates;
  (d) treating the deteriorated hydrogenation catalyst with acid selected from the group consisting of a mineral acid, a sulfonic acid, oxalic acid, and mixtures thereof, and thereafter washing the catalyst, to thereby restore catalytic activity; and
  (e) repeating step (c).

21. A method of activating a catalyst for hydrogenation of anthraquinones or derivatives thereof used in production of hydrogen peroxide, comprising treating the catalyst with an acid selected from the group consisting of a mineral acid, a sulfonic acid, and mixtures thereof, and thereafter washing the catalyst, wherein the catalyst has previously been used for production of hydrogen peroxide.

22. A method of activating a catalyst for hydrogenation of anthraquinones or derivatives thereof used in production of hydrogen peroxide, comprising treating the catalyst with an acid selected from the group consisting of a mineral acid, a sulfonic acid, oxalic acid, and mixtures thereof, and thereafter washing the catalyst, wherein the catalyst has previously been used for production of hydrogen peroxide and comprises an active material selected from the group consisting of palladium, platinum, rhodium, ruthenium, and mixtures thereof.

* * * * *